(12) United States Patent  (10) Patent No.: US 7,448,140 B2
Nash                      (45) Date of Patent:    Nov. 11, 2008

(54) EMERGENCY RESPONDER'S ORIENTATION METHOD AND DEVICE

(76) Inventor: Steven D. Nash, 37449 Arlington Dr., Willoughby, OH (US) 44094

( * ) Notice: Subject to any disclaimer, the term of this patent is extended or adjusted under 35 U.S.C. 154(b) by 35 days.

(21) Appl. No.: 11/737,765

(22) Filed: Apr. 20, 2007

(65) Prior Publication Data

US 2007/0266575 A1     Nov. 22, 2007

Related U.S. Application Data

(60) Provisional application No. 60/801,144, filed on May 18, 2006.

(51) Int. Cl.
 *G01C 17/04* (2006.01)
(52) U.S. Cl. .................... 33/355 R; 33/348
(58) Field of Classification Search ............... 33/355 R, 33/356, 358, 364, 348
 See application file for complete search history.

(56) References Cited

U.S. PATENT DOCUMENTS

| 994,901 | A |  | 6/1911 | Barbow |
| 1,720,964 | A |  | 7/1929 | Metcalf |
| 1,819,310 | A |  | 8/1931 | Wilson |
| 2,303,990 | A |  | 12/1942 | Dietz |
| 2,489,430 | A | * | 11/1949 | Oliver ......................... 33/348 |
| 2,738,412 | A |  | 3/1956 | Spencer et al. |
| 3,300,867 | A |  | 1/1967 | Sampson |
| D218,342 | S |  | 8/1970 | Rice, Jr. |
| 3,664,292 | A |  | 5/1972 | Sherman |
| 3,871,108 | A |  | 3/1975 | Beaudout |
| 4,414,754 | A |  | 11/1983 | Lapeyre |
| 4,616,423 | A | * | 10/1986 | Shephard .................. 33/355 R |
| D302,124 | S |  | 7/1989 | Bevins |

(Continued)

OTHER PUBLICATIONS

Pak-Tracker brochure, Scott Health & Safety, Monroe, NC, USA, www.scotthealthandsafety.com/PDFs/Bro_PakTracker_HS_6554B_606.pdf.
Tracker FRT and Tracker ET descriptions, Exit Technologies, Boulder, Colorado, USA, www.exit-technologies.com plus / is home page; /tracker/tracker_frt.php is FRT model; and /tracker/egress_transmitter.php is ET model (these pages are combined in pdf copy supplied).

*Primary Examiner*—G. Bradley Bennett
(74) *Attorney, Agent, or Firm*—Dwight A. Stauffer Patent Services

(57) ABSTRACT

A method and device has been developed to enable emergency responders to maintain and communicate their orientation relative to a fire building or other emergency incident area as they work in and around it. The device is a specialized compass enhancement providing a standalone unit that each responder can carry. The device has a multipart structure including: (1) an underlying base is a simple compass that the responder orients to north. (2) A bezel rotatable around the simple compass is preferably square in shape and represents the building or incident area and is labeled with NIMS standardized ABCD designations. (3) An optional rotatable pointer can be independently positioned to indicate a direction to be remembered such as the direction in which the responder entered the incident area. All of the parts can be synchronized among users at any time by radioing simple verbal descriptions of the rotational setting(s).

18 Claims, 2 Drawing Sheets

U.S. PATENT DOCUMENTS

| | | |
|---|---|---|
| 4,899,453 A | 2/1990 | Bhat et al. |
| D314,517 S | 2/1991 | Dubois |
| 5,146,687 A | 9/1992 | Kjellstrom |
| D334,890 S | 4/1993 | Meyer |
| 5,596,551 A * | 1/1997 | Born et al. .................... 33/271 |
| 5,883,861 A * | 3/1999 | Moser et al. .................. 33/334 |
| 6,145,209 A | 11/2000 | Chang |
| D434,993 S | 12/2000 | Barker |
| 6,796,044 B2 | 9/2004 | Prieschl |
| 6,973,732 B1 | 12/2005 | Chang |
| 2005/0268477 A1* | 12/2005 | Chang ..................... 33/355 R |

* cited by examiner

EMERGENCY RESPONDER'S ORIENTATION METHOD AND DEVICE

CROSS-REFERENCE TO RELATED APPLICATIONS

This application claims the benefit of U.S. Provisional Patent Application No. 60/801,144, filed May 18, 2006 by Nash.

TECHNICAL FIELD OF THE INVENTION

The present invention relates to personal orientation method and device and, more particularly to orientation for emergency responders.

BACKGROUND OF THE INVENTION

Structural fires are trending toward burning hotter and faster due to the nature of materials used for interior finishes and furnishings. In addition, larger 'box' type stores and warehouses with vast interior spaces are becoming the norm across the country. Outdoor wildfires are particularly dangerous because wind and ground conditions can cause sudden changes in the bounds of the fire and smoke obscures visual cues leading to disorientation. Many times, there is quite a bit of confusion on a fireground (general area of a fire). Adverse weather conditions, darkness, obscuring smoke, and panicking occupants and bystanders add to this overall confusion. In the midst of this confusion, a firefighter tries to maintain his/her focus, assess the situation, and attempt to bring it under control.

During a firefight, responders entering a hazardous area may become disoriented. A common means of orientation is to follow the "hose line", but particularly in dark and/or smoky buildings responders can easily lose track of the hose line and become disoriented, not knowing which direction to go for an exit path (which is usually the way the responder entered the fireground.) Since most self contained breathing apparatus provides approximately 30 minutes of breathing air, a lost responder has little time to react and find a way out. If the responder becomes confused, the result can be fatal for that individual and potentially fatal for any crew attempting a rescue. In fact, according to the National Institute of Occupational Safety and Health (NIOSH), each year tens of thousands of firefighters are injured while performing their duties. Firefighter disorientation is one of fire fighting's most serious hazards and is the leading cause of injuries and fatalities of firefighters.

A survey of firefighters conducted for the inventor indicated that a very high percentage of those surveyed believe that a new device and/or method is necessary to assist firefighters in finding their way out of danger as quickly as possible. To date this great need has been unmet. For example, thermal imaging devices can help to find a lower temperature area which might be a way through the fireground (fire building), but this only reads surface temperatures in line of sight, and is too bulky and expensive for use by individual firefighters. For example, GPS devices do not work well indoors, if at all. For example, a tracker system (e.g., Pak-Tracker™, by Scott Health & Safety; Monroe, N.C.) allows rescuers with a special receiver to locate lost responders if they have activated their corresponding transmitter, but the system is expensive and doesn't help an individual to exit a dangerous area on his/her own. For example, another tracker system (e.g., Tracker FRT™, by Exit Technologies; Boulder, Colo.) includes "egress transmitters" that can be tracked using a unit carried by each responder; but this requires an added procedure of laying down the egress transmitters like cookie crumbs while entering the fireground. Potential problems include disabling of the egress transmitters by harsh conditions; and also the fact that this doesn't provide for radioing a new route to a trapped responder when the original marked route is no longer usable. For example, a regular north-pointing compass does not associate fireground landmarks with compass directions.

A standardized US procedure for dealing with emergency incidents is the "Incident Command System (ICS)" that is a part of the "National Incident Management System (NIMS)" of guidelines, policies and principles. This system includes standardized landmark designations that are commonly recognized by all responders and their controller (Incident Manager, IC) at the fireground (or "incident site"). Simply stated, in the case of a building fire, guidelines define A, B, C, and D sides of a building with reference to the nearest street, and go around the building clockwise from the "A" side which is the side facing the nearest street. In this way, even though a building will likely have unique and varied names for portions of the building, every firefighter in that building will have just four standardized names for four standard portions of the building: the four sides of the building. This matters to the firefighter because in all communications (generally by radio) they refer to directions in the building with reference to the standardized named portions (landmarks) of the building, each of which has the universally understood simple ABCD labels; or else the firefighters may relate a direction to the location of the command post (CP) which can be anywhere but is communicated as a location relative to the ABCD designations. Even with this clearly understood labeling of fireground landmarks, however, a firefighter within a building who has become disoriented will have lost track of the landmarks and likely will not be able to see the exterior walls in order to become re-oriented.

Thus there is a great need for a new orientation device and/or method that can be implemented by any responder at an incident site, particularly a fireground, and most particularly when the responder is within a building. If substantially all of the responders are to use such a new device, it must be small enough and moderately priced such that every responder can carry and use his/her own device.

BRIEF SUMMARY OF THE INVENTION

The inventive device has been developed to enable firefighters, their exterior sector officer and the fireground commander (IC) to maintain their orientation relative to the fire building or area as they battle interior structural fires or outdoor wild fires. The device is a specialized and enhanced compass that is designed as a stand alone unit that each firefighter can carry onto the scene. The compass has a multipart structure: (1) The underlying base is a normal compass that the firefighter will orient to north. (2) A rotatable bezel (preferably square in shape) represents the fire building or incident area and is labeled with NIMS standardized ABCD designations. (3) An optional rotatable pointer can either represent the direction in which the responder entered the hazardous area or the location of the command post.

All three parts can be set at any point during the operation by radioing the Fireground Commander and obtaining the needed rotational positions.

According to the invention, an emergency responder's orientation device for use in an incident area that may be a building, is disclosed, the device comprising: a north-pointing compass having a center axis and a scale labeled to identify amounts of rotation around the axis; and a bezel, rotatable about the axis, and labeled to identify radially outward directions toward named portions of the incident area; wherein the bezel labels and the scale labels are arranged such that at least one of the bezel labels can be seen to align with a scale label.

Further according to the invention: the bezel is rectangular in shape to represent an incident area that has four sides, each side being one of the named portions of the incident area; and at least one of the four bezel sides is labeled with a standardized incident area side name. Preferably the bezel is square in shape; and the standardized incident area side names are the letters A, B, C and D assigned to bezel sides in clockwise order from A to D, all according to standards of the National Incident Management System (NIMS) of the United States.

Further according to the invention: there is a pointer that is independently rotatable around the axis to indicate a radial direction to be remembered. Preferably click-stop and/or frictional resistance to movement is incorporated in the rotational connection of the pointer to the device.

According to the invention, the orientation device further comprises click-stop and/or frictional resistance to movement that is incorporated in the rotational connection of the bezel to the device.

According to the invention, the orientation device further comprises tactile elements on the bezel, positioned as tactile labels identifying radially outward directions.

According to the invention, the orientation device is such that the amount of rotation around the axis is angularly measured clockwise from a label for the northerly radial direction. Preferably the scale has north, east, south, and west labels spaced 90 degrees apart in clockwise order as for compass directions.

According to the invention, the orientation device further comprises illumination of the compass north-pointing indicator and of the scale labels. Preferably there is a switch for turning on electrically operated illumination. Alternatively the illumination is provided by luminescent material.

According to the invention, the orientation device is such that a bezel label is shaped in the form of a radial pointer.

According to the invention, the orientation device is such that: the compass has a body that extends radially outward from the center axis; the bezel is rotationally mounted on the body, does not extend as far outward as the body, and reveals the north-pointing indicator of the compass; the scale labels are on the body outside the radial extent of the bezel; and a label for the northerly direction is positioned such that the north-pointing indicator can be seen to align with it when the body is turned to cause that alignment.

According to the invention, the orientation device further comprises a hanger ring or a strap with a clasp.

According to the invention, the device may be affixed on, or built-in to, a tool or an item of clothing. In a preferred example, the tool is a battery powered lantern; and the lantern battery is used to power illumination of the device.

According to the invention, a method of orientation using the orientation device comprises the steps of:

a) setting the device by one of two methods, the first setting method being turning the device until the north-pointing indicator is aligned with a scale label for the northerly direction, then rotating the bezel until it is visually oriented such that the bezel labels point in the direction of named portions of the incident area; and the second setting method being to receive setting instructions that comprise a bezel label and a scale label that are to be aligned, and then to rotate the bezel to carry out the setting instructions; and b) orienting oneself relative to the incident area by turning the device which has been set in step (a) until the north-pointing indicator is aligned with a scale label for the northerly direction, then utilizing the bezel labels as radial pointers in the direction of correspondingly named portions of the incident area.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Such relationships, if any, between similar elements in the same or different figures will become apparent throughout the specification, including, if applicable, in the claims and abstract.

Figure 1:
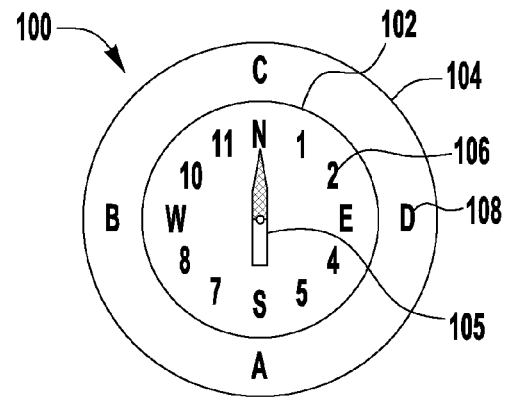

The structure, operation, and advantages of the present preferred embodiment of the invention will become further apparent upon consideration of the following description taken in conjunction with the accompanying drawings, wherein:

FIG. 1 is a schematic plan view of a basic embodiment of an orientation device according to the invention.

Figure 2:
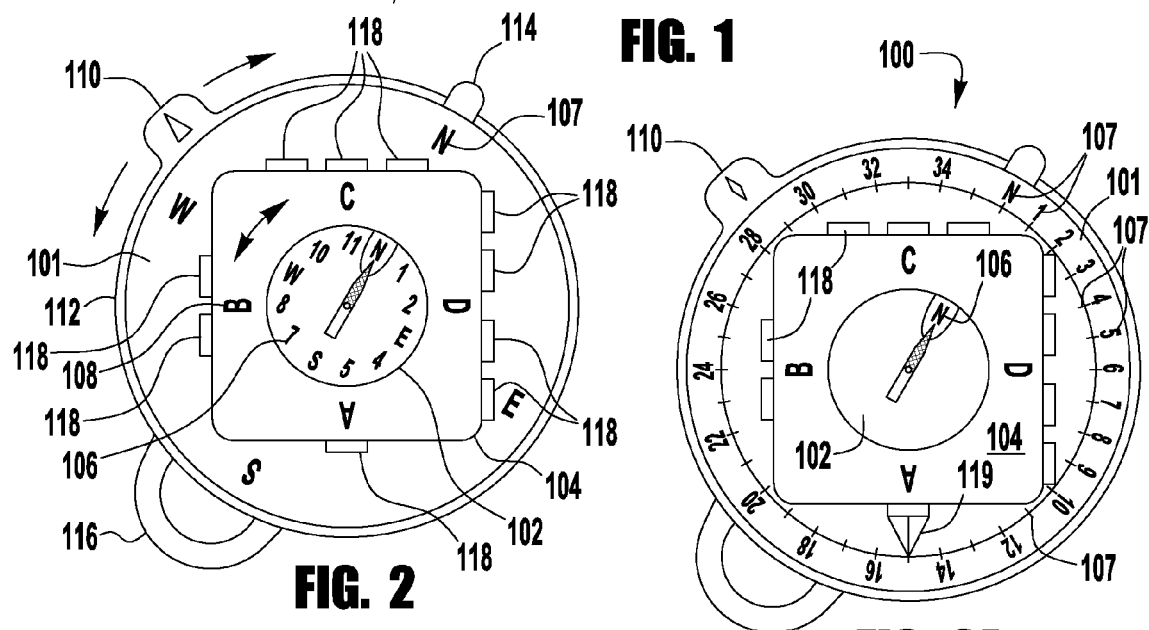

FIG. 2 is a plan view of an enhanced embodiment of the orientation device according to the invention.

Figure 2A:
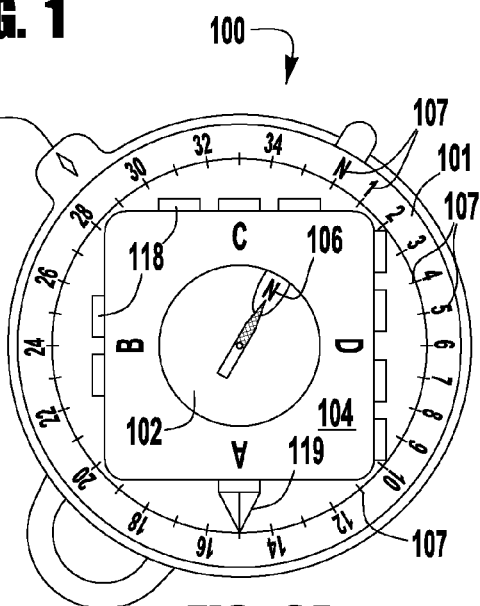

FIG. 2A is a plan view of an alternative embodiment of the orientation device of FIG. 2, according to the invention.

Figure 3:
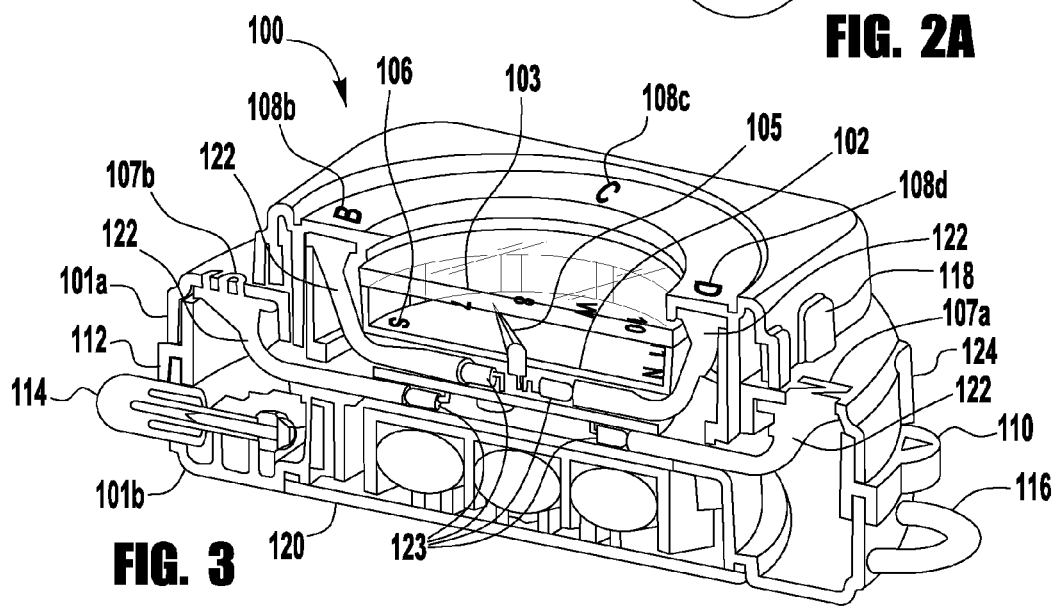

FIG. 3 is a perspective cross-sectional view of the orientation device embodiment of FIG. 2, wherein cross-section shading is omitted for clarity, all according to the invention.

Figure 4A:
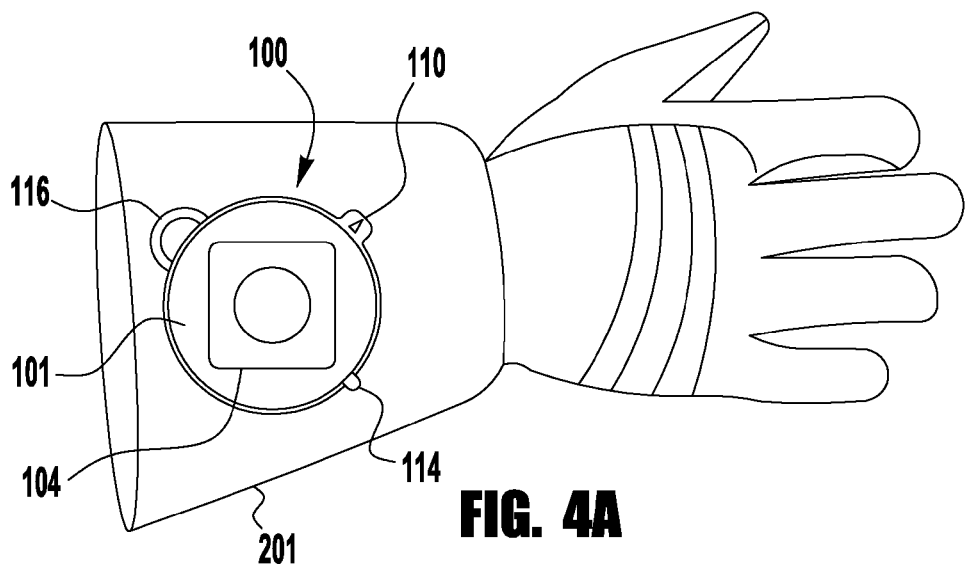

FIG. 4A is a plan view of an exemplary implementation of the orientation device schematically showing it mounted on a glove according to the invention.

Figure 4B:
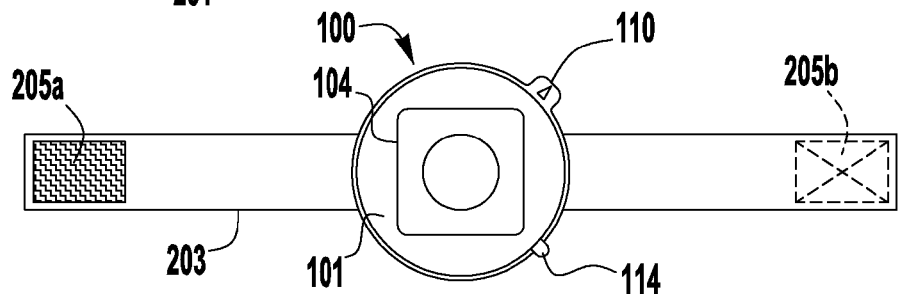

FIG. 4B is a plan view of an exemplary implementation of the orientation device schematically showing it with an attachment strap according to the invention.

Figure 4C:
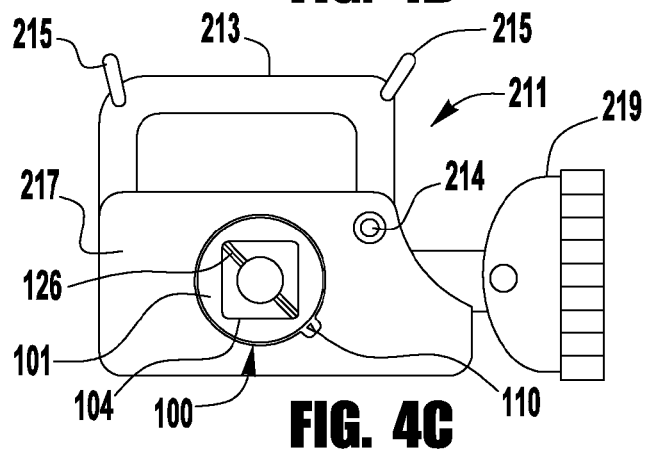

FIG. 4C is a side view of an exemplary implementation of the orientation device schematically showing it attached on, or built-in to, a lantern according to the invention.

Figure 4D:
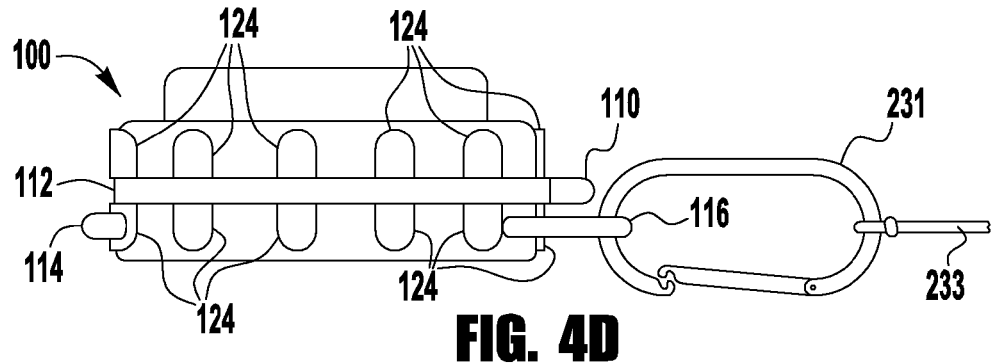

FIG. 4D is a side view of an exemplary implementation of the orientation device schematically showing it with an attachment carabiner clip and a cord according to the invention.

DETAILED DESCRIPTION OF THE INVENTION

The invention described herein concerns inventive improvements to a common "compass" (generally referred to herein as a simple compass). Because of that, the inventive orientation device may also be referred to in outside literature as a "compass" but it should be understood by context when the term refers to the inventive orientation device as opposed to a regular or simple north-pointing compass. In general, the inventive device will be distinguished by referencing it as an (inventive) "orientation device" or more simply as the "device".

Furthermore, an inventive method of orientation will be described herein with particular reference to the inventive device as it is illustrated and described as one or more representative embodiments. The embodiments are not intended to limit the scope of the invention, either in physical form as a device or as an inventive orientation method that can be implemented on any functional equivalent of the inventive device. All references to the orientation device should be understood to also refer to any orientation method that can use the device.

Even further, the disclosure herein is mainly described in terms appropriate to use of the device by firefighters working inside a building or structure that is on fire. It should be understood that this usage is merely a preferred use of the inventive device and is not limiting of the scope of applicability and usefulness for the device. References to "firefighters" should be understood as references to any device user in the generic group variously termed emergency workers, emergency responders, first responders, rescuers and so on. Similarly, a fire is one embodiment of many possible "incidents" that require the services of emergency workers/responders, and a "building" or "fire building" or "fire ground" or a wildfire area or a flood area and so on are all examples of "incident sites" or "incident areas".

Referring now to FIG. 1, a simplified basic embodiment of an inventive compass/orientation device 100 includes two main parts: a simple north-pointing compass 102, and a building bezel 104 that can be rotated around the simple compass 102. A compass needle 105 is clearly marked to identify the north-pointing end of the needle 105, and compass points are indicated on a scale in any understandable and easily discernable way. The north-pointing compass 102 can be one with a physical needle 105 as illustrated, but could equally well be a functional equivalent such as a digital compass with, for example, a lighted point that "rotates" around the compass like a needle.

For example, as shown, compass direction labels 106 may form a scale 106 that includes the four main directions N,E, S,W, for North, East, South, and West, respectively. Preferably the rest of the direction labels 106 are simplified, for example as clock face numbers. In fact almost any labeling system could be adopted as long as one point is understood to represent "north" (i.e., the direction to which the needle 105 must be pointed by rotating the simple compass 102). The building bezel 104 is labeled 108 with NIMS standard building side designations, i.e., "A", "B", "C", "D" arranged 90° apart in clockwise order.

Although not specifically illustrated in the schematic representation of FIG. 1, it should be understood that the simple compass 102 is attached to, or part of, an overall "body" that can be held while the building bezel 104 is manually rotated around the simple compass 102. Preferably the device is small enough to be held in one hand, but big enough to enable its operation by a person wearing protective clothing such as heavy firefighter's gloves. For example it could be approximately the size of a hockey puck; for example it could be as large as five by 2 inches overall.

An inventive method of using the inventive device 100 is as follows. First, a user orientates his device 100 to (magnetic) north by turning the whole device 100 so that the simple compass 102 is rotated until the needle 105 is pointing at the "north" label 106 (e.g., the letter N at the 12 o'clock position of the compass 102). Secondly, the user rotates the building bezel 104 to correspond with the orientation of the building relative to the body of the simple compass 102 when it is held with the compass needle 105 still pointing to the north "N" compass label 106. The user's orienting device 100 is now "set". This two step setting process is easily accomplished by anyone (probably outside) who has a view of the building and is able to identify at least one of its ABCD designated building sides. Preferably a team leader, incident commander, or other designated person will set her device 100 and then communicate the resultant setting to the other responders so that they can duplicate it.

Setting the device 100 aligns the building side labels 108 with specific points around the compass dial 102. For example, in FIG. 1 the illustrated setting indicates that the C side of the building is directly facing north; the A side (where the nearest street is located) is facing south; and so on. Anyone who is unable to determine the building orientation on their own can set their orientation device 100 according to simple verbal instructions (e.g., via radio) from someone who does know. In the example illustrated by FIG. 1, then, a user would simply be told to turn the building bezel 104 until the "C" building side label 108 is directly "on" N, or "12 o'clock", or whatever compass label 106 is being used to indicate magnetic north. Of course the same setting could also be described as "C to N", or "C-12", or "D-east", or "A-6" and so on. Preferably a standardized description format is used to avoid confusion. For example, building side label "A" could always be referenced to its nearest compass point label 106.

Once the user has a properly "set" orienting device 100, she can determine which direction to walk in order to proceed toward a desired building side. For example, again referring to the illustration of FIG. 1, if a user wanted to walk toward the B side of the building, she could rotate the whole device 100 until the B side label 108 is pointing away from the front of her body, and then turn her body until the needle 105 is pointing to the "north" compass label 106. Now the user is facing the B side of the building and can walk toward it simply by walking in the direction of the B side of her device 100 when it is held in front of her with the needle 105 pointing at the N label 106. Alternatively, without moving his body, a user can rotate the device 100 until the needle 105 points at the N label 106, and then the building bezel 104 will visually indicate the building orientation around him.

Of course the method assumes that the setting of the orientation device 100 is not changed by the user while he is finding a direction. In other words, for the setting of FIG. 1 the A building side label 108 must remain set on the S compass point 106. One way of resisting unintentional setting changes is to incorporate friction and/or click-stop points into the rotational connection between the simple compass 102 and the building bezel 104.

If the user remembers which side of the building he entered (e.g., the B side), then even if disoriented and/or having "lost the hose line" it is a simple matter to consult his orienting device 100 to determine where the B side is when he needs to exit the building. (Generally speaking the entry point is likely to be the best exit point for a fire building.) Alternatively, an incident commander (IC) can radio instructions to the responders with reference to the simplified NIMS directions that are oriented relative to the building's overall shape. For example, the IC may note that fire has closed off the original entrance at the B side and then radio his responders to escape through a passage recently cleared in the C side of the building.

A properly set orientation device 100 can also be used to verbally identify other points of interest at the fireground. For example, the IC could radio the location of a ladder placed at a second floor window on the D side but close to the A-D corner. Similarly, the relative location of an incident command post (ICP) can be radioed to responders.

The basics of the inventive compass/orienting device 100 (and a corresponding method of orienting a user) has been described. Many variations, enhancements and additional uses will likely be seen in light of this description. Some particularly useful examples of such variations, enhancements and additional uses will now be described with reference to the remaining illustrations, each of which shows one or more in an exemplary embodiment.

FIG. 2 shows an enhanced version of the inventive orienting device 100. The compass scale labels 106 have a visually emphasized "N" to assure proper alignment of the compass to north. The building bezel 104 is a square shape to visually and tactiley represent a four sided building, and also to make it easier to grasp the building bezel 104 for rotating it. In addition, building side indicator bumps 118 are used to provide tactile labels for the individual building sides with, for example, one bump 118 for the A side, two bumps 118 for the B side, three for C, and four bumps 118 for the D side. A device body 101 (understood but not seen in FIG. 1) extends out beyond the building bezel 104 and is fixedly attached to the simple compass 102 so that the body 101 can be held while the building bezel 104 is rotated relative to the simple compass 102 and therefore also relative to the body 101 attached thereto. Having a wider body 101 enables better recognition of the compass directions by repeating at least some of the compass point labels 106 as corresponding compass body direction labels 107 that form a rotational scale 107 on the body 101 where the labels can be larger for easier reading.

An optional hanger ring 116 is attached to the body 101. For use in dark locations, it is important to light at least the compass 102, its needle 105, and its direction labels/scale 106, 107. This could be done with luminescent materials and/or battery operated lights that are turned on by a switch, e.g., a momentary action push button switch 114.

To aid the user in remembering a direction (e.g., the building entry point), a pointer 110 is provided in a way that can be rotated around the body 101 to any desired position (i.e., the pointer 110 is rotationally connected to the device 100). In the illustration of FIGS. 2 and 3, the pointer 110 extends outward from an annular pointer ring 112 that is slidingly engaged with the periphery of the body 101, e.g., trapped between a body top 101a and a body bottom 101b. Again friction and/or click-stops can be employed to maintain position. Thus, in the example illustrated in FIG. 2, the device 100 is "set" to "A5", and the user has oriented the pointer 110 to remind him of the location of something in the direction of the B-C corner of the building. Of course a radio command could refer to the setting as A5, B8, C11, or D2. Or a heading (to which the pointer 110 could be set) could be communicated as the B-C corner, or "just past W toward 10". If that is considered awkward, then a finer scale of numbering (e.g., every 10 degrees) could be provided as body labels 107, where the greater diameter allows for readable labeling of finer subdivisions than on the small diameter compass face.

Just as the north (N) compass label 106 can be advantageously highlighted, so can a selected direction relative to the building be highlighted on the building bezel 104. For example, as shown in FIG. 2A, a building pointer 119 extends outward from the middle of the A side of the building bezel 104. The building pointer 119 is therefore another form of building side label 108. Also, since the large diameter of the body 101 provides the space to label compass points to a finer resolution, all but the North compass point labels 106 are removed and replaced by a greater number of body direction labels 107. For example the body direction labels 107 comprise alpha-numeric characters and/or tick marks that are spaced around the perimeter every ten degrees. To improve readability, every other tick mark can be labeled with the number of degrees divided by ten (at least for the two digit numbers). Thus there are 9 tick marks per quadrant (90°), and North is 0/36, East is 9, South is 18, and West is 27. If desired, the "E", "S", and "W" labels 107 can be shown in their proper places instead of numbers, as is shown for the "N" label 107. An additional way to take advantage of the better scale is to fashion the pointer 110 with an alignment point such as a diamond shape as illustrated.

A few more details of preferred features are illustrated in FIG. 3 that shows, for example, ruggedizing features such as a battery compartment/device access cover 120 that can be gasketed or screwed on to resist water and dirt penetration. Likewise a cover glass 103 is sealed over the simple compass 102 for the same purpose. Preferably the cover glass 103 is heat and scratch resistant, and easily cleaned: e.g., tempered glass, e.g., Lexan or the like. The body top 101a, pointer ring 112, and body bottom 101b are interlocked to resist water and dirt entry. Likewise, a sliding gasket seal can be provided between the building bezel 104 and the body 101, and around the light button 114.

An illuminating technique is illustrated wherein light pipes (e.g., optical fibers) 122 transmit light from light sources (e.g., LEDs) 123 to the body directional labels/scale 107 and to the building side labels 108, the labels 107, 108 are formed out of a translucent material that passes through the body or bezel material. For example the cross section cut reveals this for the "N" body label 107a and the "S" body label 107b. Though not shown, this is also true for the building side labels 108 such as the "B" side label 108b, the "C" side label 108c, and the "D" side label 108d illustrated. The simple compass 102 itself is lighted, for example, by making the compass dial/face out of a translucent material such that the LEDs 123 will shine through except where the compass point labels 106 are applied in an opaque paint, or a contrasting color translucent ink, or even luminescent paint. Obviously many other useful variations of illumination techniques are within the scope of this disclosure.

Another ease of use feature is a series of grip ridges 124, best seen in FIG. 4D. The grip ridges 124 are designed to assure positive gripping even when wet and/or muddy. For example, the grip ridges 124 are vertical ridges of rubber-like material that are spaced around the periphery of the device 100. Preferably the grip ridges 124 extend outward more than the pointer ring 112 so that the pointer 110 can be positioned without interference from a hand holding the device 100.

Many ways to implement the inventive orienting device 100 for convenience and usability are contemplated, some examples of which are illustrated in the FIGS. 4A-4D.

FIG. 4A shows an example of mounting the device 100 directly onto a user's clothing, for example the cuff of a glove 201. The compass body 101 being fixed relative to the user's arm, he can use his other hand to single-handedly rotate the building bezel 104 for setting the device 100, move the pointer 110, and operate the light button 114 while the hand in the glove is still holding onto something else, e.g., a hose or tool. The hanger ring 116 could be omitted, or perhaps used to clip the glove onto a belt.

FIG. 4B shows an example of a "watch band" or strap-on implementation of the device 100 in which the body 101 is affixed to a strap 203 with a closure 205 such as hook-and-loop material with hook material 205a on one end of the strap 203 and mating loop material 205b on the other end. As in the glove 201 implementation, the strap-on version enables single handed operation of the building bezel 104, the light button 114, the pointer 110, etc.

FIG. 4C shows an example of the device 100 being attached on or built-in to a piece of responder's equipment, for example a battery operated lantern 211 such as are commonly used by responders, especially firefighters and rescuers. In this example, the lantern 211 has a handle 213, possibly with hanger rings 215, a case 217 that contains the battery, and the lamp 219. The device 100 could be attached anywhere, such as on top of the case 217 or the handle 213, but is shown here in a preferred location on the side of the case 217. It can be simply affixed on the case 217, but is most advantageously built into the case 217. This would provide a measure of protection since most of the body 101 could be inside the case 217, even recessed enough that the building bezel 104 would be beneath the surface in a cavity that still allowed space to grasp the building bezel 104 in order to rotationally set the device 100. The recess could be a smaller diameter if a turnkey 126 is attached to extend outwards from the building bezel 104. The pointer 110 could extend out from the case 217; it could slide around an annular recess, etc.

A big advantage of attaching the inventive orientation device 100 to another battery operated device such as the lantern 211 is being able to utilize the much more powerful and long lasting lantern battery to power the compass illumination (e.g., LEDs 123). Thus a larger power switch 214 is conveniently located on the case 217 and can be used to operate both the lamp 219 and the compass illumination, for example turning them both on at the same time.

FIG. 4D shows an example wherein the orienting device 100 can be removably attached to the clothing or equipment of a user by means of a carabiner style spring clip ring 231 that is hooked onto the hanger ring 116. The carabiner 231 can then be hooked onto a D-ring, a belt loop, etc. A lanyard or hanging cord 233, possibly retractable, can also be used.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth herein above will occur to one having ordinary skill in the art to which the present invention most nearly pertains, and such variations are intended to be within the scope of the invention, as disclosed herein.

What is claimed is:

1. An emergency responder's orientation device for use in an incident area that may be a building, the device comprising:
    a north-pointing compass having a center axis and a scale labeled to identify amounts of rotation around the axis; and
    a bezel, rotatable about the axis, and labeled to identify radially outward directions toward named portions of the incident area; wherein
    the bezel labels and the scale labels are arranged such that at least one of the bezel labels can be seen to align with a scale label.

2. The orientation device of claim 1 wherein:
    the bezel is rectangular in shape to represent an incident area that has four sides, each side being one of the named portions of the incident area; and
    at least one of the four bezel sides is labeled with a standardized incident area side name.

3. The orientation device of claim 2 wherein:
    the bezel is square in shape; and
    the standardized incident area side names are the letters A, B, C and D assigned to bezel sides in clockwise order from A to D, all according to standards of the National Incident Management System (NIMS) of the United States.

4. The orientation device of claim 1 further comprising:
    a pointer that is independently rotatable around the axis to indicate a radial direction to be remembered.

5. The orientation device of claim 4 further comprising:
    click-stop and/or frictional resistance to movement that is incorporated in the rotational connection of the pointer to the device.

6. The orientation device of claim 1 further comprising:
    click-stop and/or frictional resistance to movement that is incorporated in the rotational connection of the bezel to the device.

7. The orientation device of claim 1 further comprising:
    tactile elements on the bezel, positioned as tactile labels identifying radially outward directions.

8. The orientation device of claim 1 wherein:
    the amount of rotation around the axis is angularly measured clockwise from a label for the northerly radial direction.

9. The orientation device of claim 8 wherein:
    the scale has north, east, south, and west labels spaced 90 degrees apart in clockwise order as for compass directions.

10. The orientation device of claim 1 further comprising:
    illumination of the compass north-pointing indicator and of the scale labels.

11. The orientation device of claim 10 further comprising:
    a switch for turning on electrically operated illumination.

12. The orientation device of claim 10 wherein:
    the illumination is provided by luminescent material.

13. The orientation device of claim 1 wherein:
    a bezel label is shaped in the form of a radial pointer.

14. The orientation device of claim 1 wherein:
    the compass has a body that extends radially outward from the center axis;
    the bezel is rotationally mounted on the body, does not extend as far outward as the body, and reveals the north-pointing indicator of the compass;
    the scale labels are on the body outside the radial extent of the bezel; and
    a label for the northerly direction is positioned such that the north-pointing indicator can be seen to align with it when the body is turned to cause that alignment.

15. The orientation device of claim 1 further comprising:
    a hanger ring or a strap with a clasp.

16. The orientation device of claim 1 wherein:
    the device is affixed on, or built-in to, a tool or an item of clothing.

17. The orientation device of claim 16 wherein:
    the tool is a battery powered lantern; and
    the lantern battery is used to power illumination of the device.

18. A method of orientation using the device of claim 1, the method comprising the steps of:
    a) setting the device by one of two methods, the first setting method being turning the device until the north-pointing indicator is aligned with a scale label for the northerly direction, then rotating the bezel until it is visually oriented such that the bezel labels point in the direction of named portions of the incident area; and the second setting method being to receive setting instructions that comprise a bezel label and a scale label that are to be aligned, and then to rotate the bezel to carry out the setting instructions; and b) orienting oneself relative to the incident area by turning the device which has been set in step (a) until the north-pointing indicator is aligned with a scale label for the northerly direction, then utilizing the bezel labels as radial pointers in the direction of correspondingly named portions of the incident area.

\* \* \* \* \*